US010180900B2

(12) United States Patent
Ramraz

(10) Patent No.: US 10,180,900 B2
(45) Date of Patent: Jan. 15, 2019

(54) RECORDATION OF USER INTERFACE EVENTS FOR SCRIPT GENERATION

(71) Applicant: Red Hat Israel, Ltd., Ra'anana (IL)

(72) Inventor: Oded Ramraz, Ra'anana (IL)

(73) Assignee: RED HAT ISRAEL, LTD., Ra'anana (IL)

( * ) Notice: Subject to any disclaimer, the term of this patent is extended or adjusted under 35 U.S.C. 154(b) by 201 days.

(21) Appl. No.: 15/130,342

(22) Filed: Apr. 15, 2016

(65) Prior Publication Data

US 2017/0300403 A1 Oct. 19, 2017

(51) Int. Cl.
*G06F 9/44* (2018.01)
*G06F 11/36* (2006.01)
*G06F 11/34* (2006.01)
*G06F 17/30* (2006.01)

(52) U.S. Cl.
CPC .......... *G06F 11/3684* (2013.01); *G06F 11/34* (2013.01); *G06F 11/3414* (2013.01); *G06F 17/30* (2013.01)

(58) Field of Classification Search
CPC ... G06F 11/34; G06F 11/3414; G06F 11/3684
See application file for complete search history.

(56) References Cited

U.S. PATENT DOCUMENTS

| 5,781,720 | A | 7/1998 | Parker et al. |
| 8,001,468 | B2 | 8/2011 | Khaladkar et al. |
| 8,312,428 | B2 | 11/2012 | Zhao |
| 8,490,056 | B2 | 7/2013 | Lau et al. |
| 8,572,568 | B2 | 10/2013 | Giat |
| 9,098,636 | B2 | 8/2015 | De Angelis et al. |
| 9,141,518 | B2 | 9/2015 | Bharadwaj et al. |
| 9,501,751 | B1 * | 11/2016 | Holler ............... G06Q 10/06 |
| 2007/0234274 | A1 * | 10/2007 | Ross ..................... G06F 8/34 717/101 |
| 2009/0287643 | A1 * | 11/2009 | Corville ............... G06F 3/023 |

(Continued)

FOREIGN PATENT DOCUMENTS

WO    WO2015147656 A2    10/2015

OTHER PUBLICATIONS

Khaled Mohammed, UI Automation Verify, Published Dec. 31, 2014, https://msdn.microsoft.com/en-us/library/windows/desktop/hh920986(v=vs.85).aspx.

(Continued)

*Primary Examiner* — Lewis A Bullock, Jr.
*Assistant Examiner* — Tina Huynh
(74) *Attorney, Agent, or Firm* — Haynes and Boone, LLP; Andrew Ehmke; Thuc Nguyen

(57) ABSTRACT

An example method of generating one or more scripts specific to an application programming interface (API) type and language and in accordance with user-selected events includes receiving an API type and a language in which to implement a script. Events selected by a user via a graphical user interface in response to receiving a request to record the events may be recorded. Additionally, the user-selected events may be mapped to a set of commands specific to the API type and the language. Additionally, a script including a first command to import a set of modules specific to the API type and language, a second command to create a computing session, and the set of commands is generated.

18 Claims, 8 Drawing Sheets

(56) References Cited

U.S. PATENT DOCUMENTS

2016/0085520 A1* 3/2016 Zhao .................. G06F 8/35
717/105
2017/0102925 A1* 4/2017 Ali ..................... G06F 8/36

OTHER PUBLICATIONS

UI Testing in Xcode, Published 2015, https://developer.apple.com/videos/play/wwdc2015/406/.
Nicholas Rosevear, APIs UI Automation and You, Published Dec. 17, 2013, https://prezi.com/gfv-c2wiggqc/apis-ui-automation-and-you/.

* cited by examiner

US 10,180,900 B2

RECORDATION OF USER INTERFACE EVENTS FOR SCRIPT GENERATION

BACKGROUND

A test management tool that manages the test process can save software testers the hassle of installing separate applications that are necessary for the testing process. They can be implemented with minimal programming ability, allowing for easy installation and monitoring of the test process across multiple project groups. Once installed, teams have instant access to a user interface and can immediately start running and recording test cases. These types of applications are designed to simplify the test management process with high levels of automation and tracking built in, yet don't require advanced programming skills or knowledge to implement. They are useful for teams who manage a variety of test cases and for larger teams who need an all-inclusive application for project management. A software developer may desire to automate specific scenarios for particular reasons. For example, the software developer may want to reproduce a bug or add a use case to a regression test suite.

BRIEF SUMMARY

Methods, systems, and techniques for generating a script specific to an application programming interface (API) type and language and in accordance with user-selected events are provided.

According to some embodiments, a method of generating a script specific to an API type and language and in accordance with user-selected events includes receiving an API type and a language in which to implement a script. The method also includes recording events selected by a user via a graphical user interface in response to receiving a request to record the events. The method further includes mapping the user-selected events to a set of commands specific to the API type and the language. The method also includes generating a script including a first command to import a set of modules specific to the API type and language, a second command to create a computing session, and the set of commands.

According to some embodiments, a system for generating a script specific to an API type and language and in accordance with user-selected events includes an event recorder that records events selected by a user via a graphical user interface in response to receiving a request to record the events. The system also includes a script generator that receives an API type and a language in which to implement a script, maps the user-selected events to a set of commands specific to the API type and the language, and generates a script including a first command to import a set of modules specific to the API type and language, a second command to create a computing session, and the set of commands.

According to some embodiments, a non-transitory machine-readable medium includes a plurality of machine-readable instructions that when executed by one or more processors are adapted to cause the one or more processors to perform a method including: receiving an API type and a language in which to implement a script; recording events selected by a user via a graphical user interface in response to receiving a request to record the events; mapping the user-selected events to a set of commands specific to the API type and the language; and generating a script including a first command to import a set of modules specific to the API type and language, a second command to create a computing session, and the set of commands.

According to some embodiments, an apparatus for generating a script specific to an application programming interface (API) type and language and in accordance with user-selected events includes means for receiving an API type and a language in which to implement a script. The apparatus also includes means for recording events selected by a user via a graphical user interface in response to receiving a request to record the events. The apparatus further includes means for mapping the user-selected events to a set of commands specific to the API type and the language. The apparatus also includes means for generating a script including a first command to import a set of modules specific to the API type and language, a second command to create a computing session, and the set of commands.

BRIEF DESCRIPTION OF THE DRAWINGS

The accompanying drawings, which form a part of the specification, illustrate embodiments of the invention and together with the description, further serve to explain the principles of the embodiments. In the drawings, like reference numbers may indicate identical or functionally similar elements. The drawing in which an element first appears is generally indicated by the left-most digit in the corresponding reference number.

DETAILED DESCRIPTION

I. Overview
II. Example System Architecture
III. Example Process Flow
IV. Example Method
V. Example Computing System I. Overview It is to be understood that the following disclosure provides many different embodiments, or examples, for implementing different features of the present disclosure. Some embodiments may be practiced without some or all of these specific details. Specific examples of components, modules, and arrangements are described below to simplify the present disclosure. These are, of course, merely examples and are not intended to be limiting.

Unless specifically stated otherwise, as apparent from the following discussion, it is appreciated that throughout the description, discussions utilizing terms such as "determining," "storing," "recording," "receiving," "sending," "mapping," "executing," "generating," "searching," "identifying," "authenticating," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

II. Example System Architecture

Figure 1:
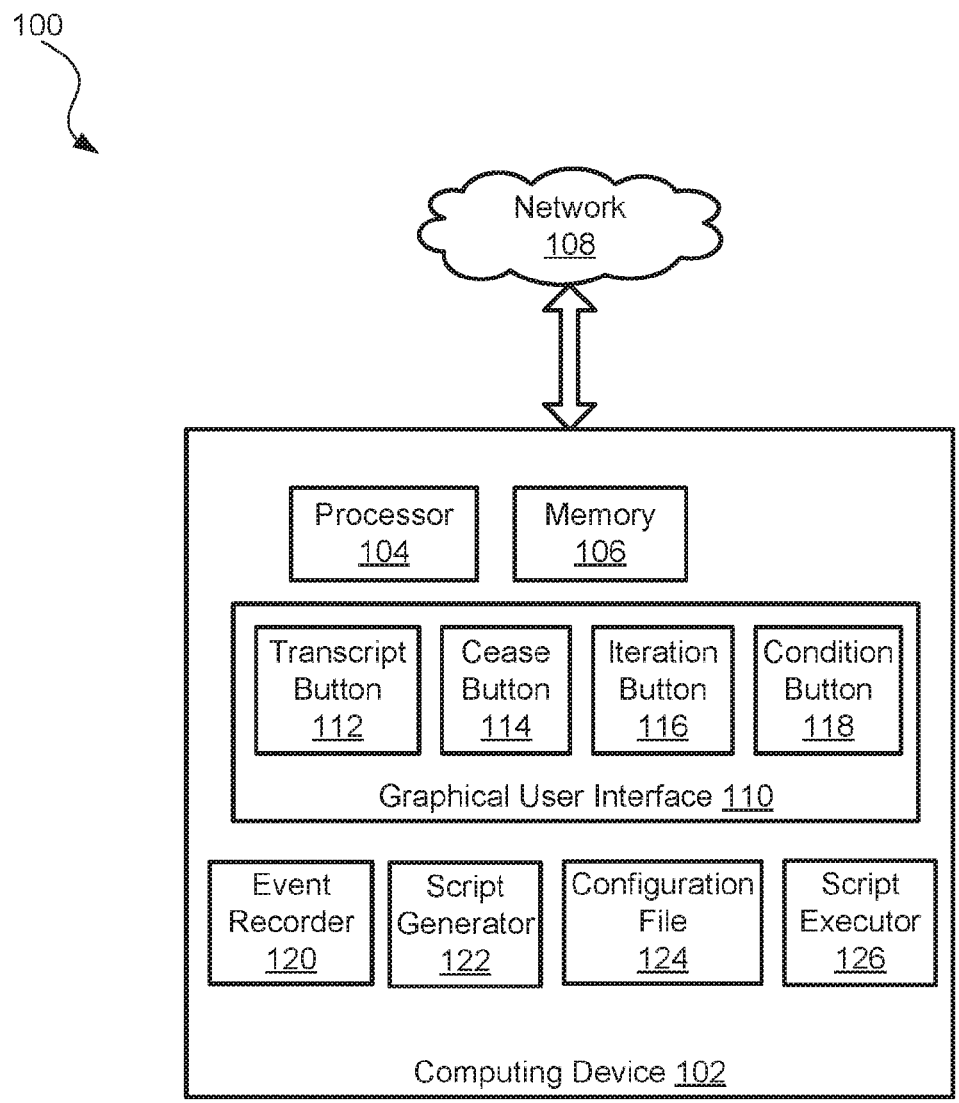
FIG. 1 is a block diagram illustrating a system for generating a script corresponding to events selected by a user via a graphical user interface in accordance with one or more embodiments.

FIG. 1 is a block diagram illustrating a system 100 for generating a script corresponding to events selected by a user via a graphical user interface in accordance with one or more embodiments. System 100 includes a computing device 102 including a processor 104 and a memory 106. Processor 104 may represent one or more processors acting in concert. A "processor" may also be referred to as a "CPU" or "physical processor" herein. A processor shall refer to a device capable of executing instructions encoding arithmetic, logical, or I/O operations. In one illustrative example, a processor may follow the Von Neumann architectural model and may include an arithmetic logic unit (ALU), a control unit, and a plurality of registers. In a further aspect, a processor may be a single-core processor that is typically capable of executing one instruction at a time (or process a single pipeline of instructions), or a multi-core processor that may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket).

Memory 104 may be one or more of many different types of memory. "Memory" herein shall refer to volatile or non-volatile memory, such as random access memory (RAM), read-only memory (ROM), electrically erasable ROM (EEPROM), or any other memory capable of storing data. Some types of memory, such as solid state drives typically have relatively larger storage volume but relatively slower performance. Other types of memory, such as those used for RAM, are optimized for speed and are often referred to as "working memory." The various types of memory may store information in the form of software and data. The software may include an operating system and various other software applications.

In some examples, computing device 102 may be coupled over a network 108. Network 108 may include various configurations and use various protocols including the Internet, World Wide Web, intranets, virtual private networks, wide area networks, local networks, private networks using communication protocols proprietary to one or more companies, cellular and other wireless networks, Internet relay chat channels (IRC), instant messaging, simple mail transfer protocols (SMTP), Ethernet, WiFi and HTTP, and various combinations of the foregoing. Although one computing device is illustrated, other embodiments including more than one computing device is within the scope of the present disclosure.

Computing device 102 includes a graphical user interface 110 with which a user may interact to provide input to or receive output from computing device 102. Graphical user interface 110 includes user interface elements that are displayed on a screen coupled to computing device 102 and that are selectable by the user. In the example illustrated in FIG. 1, the user interface elements include a transcript button 112, cease button 114, iteration button 116, and condition button 118. One of more of these buttons may have a corresponding input box that the user may enter additional information (e.g., a particular number of times to iterate). Although graphical user interface 110 is shown as including four user interface elements, it should be understood that graphical user interface 110 may include fewer or more than four user interface elements. In an example, the user may send a request to computing device 102 to perform particular actions based on the user's selection of a user interface element in graphical user interface 110. These selected events may be referred to as user-selected events and may be performed to accomplish a task (e.g., create a virtual machine).

Computing device 102 includes configuration file 124 that stores information associated with generating one or more scripts specific to one or more API types and/or one or more languages. Computing device 102 also includes event recorder 120, script generator 122, and script executor 126. If transcript button 112 is selected by the user via graphical user interface 110, event recorder 120 records events selected by the user via the graphical user interface. If cease button 114 is selected by the user via graphical user interface 110, event recorder 120 stops recording events selected by the user via the graphical user interface.

A user may enter a number into an input box corresponding to iteration button 116. In an example, the number represents the number of times the user desires an action to be performed. In such an example, if iteration button 116 is selected by the user via graphical user interface 110, script executor 126 may execute a script generated by script generator 122 "X" number of times, where "X" is the number entered into the input box. Execution of the script "X" number of times may accomplish a task "X" number of times. For example, if the task is to create a new virtual machine and assign the newly created virtual machine 32 gigabytes (GBs) of virtual disk memory, the user enters in the number "10," and selects iteration button 116, script executor 126 may execute the script 10 times, thus resulting in ten virtual machines having 32 GBs of allocated virtual disk space being created.

In another example, the number represents the number of times the user desires a set of commands to be executed in a script. If iteration button 116 is selected by the user via graphical user interface 110, script generator 122 may insert the set of commands "X" times into the script, where "X" is the number entered into the input box. The user may specify a user-selected event (e.g., create a virtual machine), the number "X," (e.g., 10), and select iteration button 116. In this example, script generator 122 may receive the user-selected event and "10" as parameters and specify in the script that this user-selected event is to be executed 10 times. Accordingly, script executor 126 may execute this script once, with the result being that 10 virtual machines are created. In an example, a command may specify to repeat the following user-selected event X times using the following name: name$i, where "I" represents the iteration number.

If iteration button 116 is selected by the user via graphical user interface 110, event recorder 120 may record the user-selected event "X" times into a file that is read by the script generator 122. In this example, the script generator 122 may insert the set of commands to which the user-selected events maps "X" number of times into the script.

Accordingly, the user may specify a particular number of times to execute a set of commands corresponding to a user-selected event. Execution of the script may accomplish a task "X" number of times.

A user may enter a condition into an input box corresponding to condition button 118. The user may desire the condition to be satisfied before performing a specified action or executing specified API code. In an example, the condition may be virtual machines associated with a processor having a utilization rate of over 90%, and the action may be to stop those virtual machines satisfying the condition. If condition button 118 is selected by the user via graphical user interface 110, script generator 122 may receive the condition and specified action or API code as parameters and insert these parameters into the script. In this example, script executor 126 may execute the script and perform the specified action or execute the API code only if the condition is satisfied.

A computing environment may allow for software developers to perform actions such as, for example, software testing. A software developer may write scripts to test software using a particular language or API type that the software developer selects or is requested to use. Scripts may be specific to a particular API type and/or language. Accordingly, scripts having the same functionality may be written from scratch over and over again in order to capture different API types and/or languages. An example of an API type is a command line interface (CLI) API, software development kit (SDK) API, RESTful (Representational State Transfer) API, etc. An example of a language in which a script may be written is Python, JAVA, etc. Trademarks are the properties of their respective owners. CLI may be written in different languages (e.g., Python) and may run CLI modules. Additionally, REST may be written in any language that has a module for an HTTP (HyperText Transfer Protocol) request. Accordingly, the user may generate REST API code using multiple programming languages (e.g., Python, JAVA, etc.) It may be desirable to provide a technique to automate the generation of scripts specific to a particular API type and/or language. In an example, a script may be written in JAVA and be of the SDK API type. In another example, a script may be written in Python and be of the SDK API type.

Figure 2A:
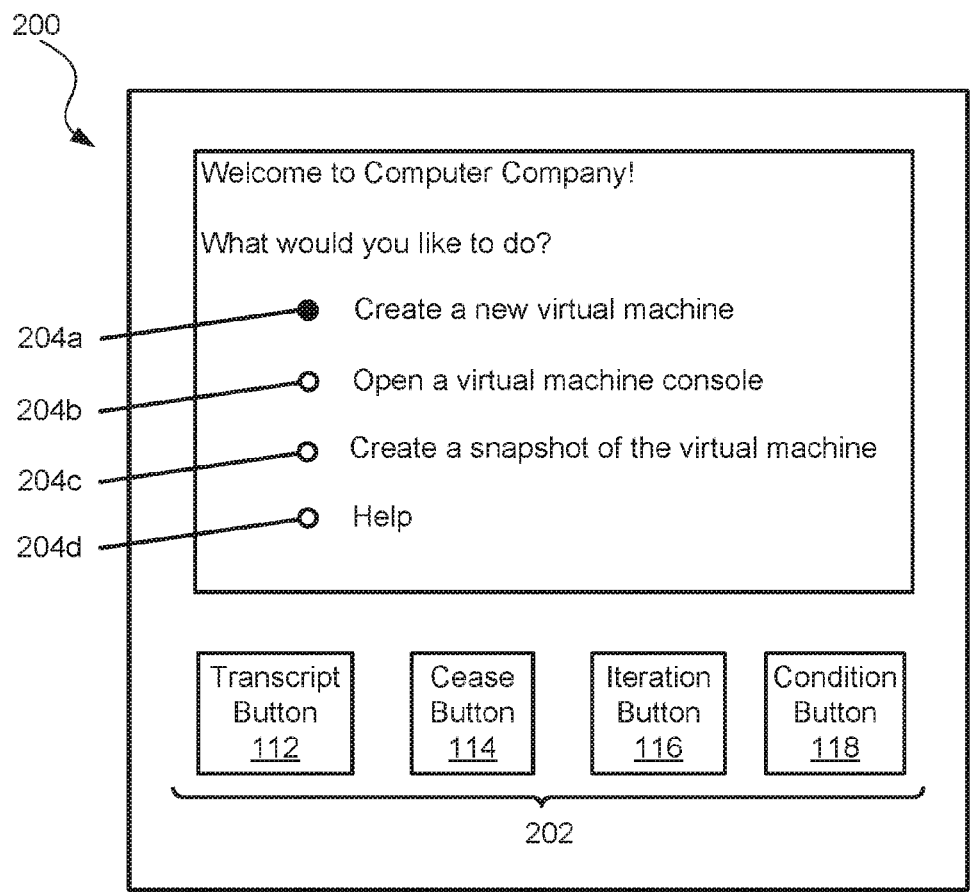
FIG. 2A is an example graphical user interface shown on a display coupled to a computing device in accordance with one or more embodiments.

It may be desirable to add functionality to computing device 102 to generate a script specific to an API type and language. In some embodiments, additional functionality may be added to graphical user interface 110 to accomplish this goal. FIG. 2A is an example graphical user interface 200 shown on a display coupled to computing device 102 in accordance with one or more embodiments. In the example illustrated in FIG. 2A, the user may view graphical user interface 200 and select a user-selectable element that is displayed on graphical user interface 200 and that corresponds to a user-selected event.

Graphical user interface 200 includes a first set of user interface elements 202 and a second set of user interface elements 204. First set of user interface elements 202 includes transcript button 112, cease button 114, iteration button 116, and condition button 118. Second set of user interface elements 204 includes a user interface element 204a corresponding to an event that creates a new virtual machine, a user interface element 204b corresponding to an event that opens a virtual machine console, a user interface element 204c corresponding to an event that creates a snapshot of the virtual machine, and a user interface element 204d corresponding to an event that provides assistance to the user.

In some examples, graphical user interface 200 is displayed on a touch-sensitive screen, and a user selects a user interface element by placing an object (e.g., the user's finger or a stylus) in close proximity to the element. For example, the user may cause a new virtual machine to be created by placing the object at a location of the screen within a threshold distance to user interface element 204a (e.g., within the circle or near the circle corresponding to user interface element 204a). In some examples, graphical user interface 200 is displayed on a screen, and a user selects a user interface element by moving a cursor via a computer mouse to a location within a threshold distance of user interface element 204a (e.g., within the circle or near the circle corresponding to user interface element 204a) on the screen and "clicking" the mouse. First set of user interface elements 202 corresponds to elements that are used to generate a script specific to an API type and/or language and are independent of the second set of user interface elements 204. For example, first set of user interface elements 202 is independent from the other user interface elements that may be displayed on the screen.

Figure 2B:
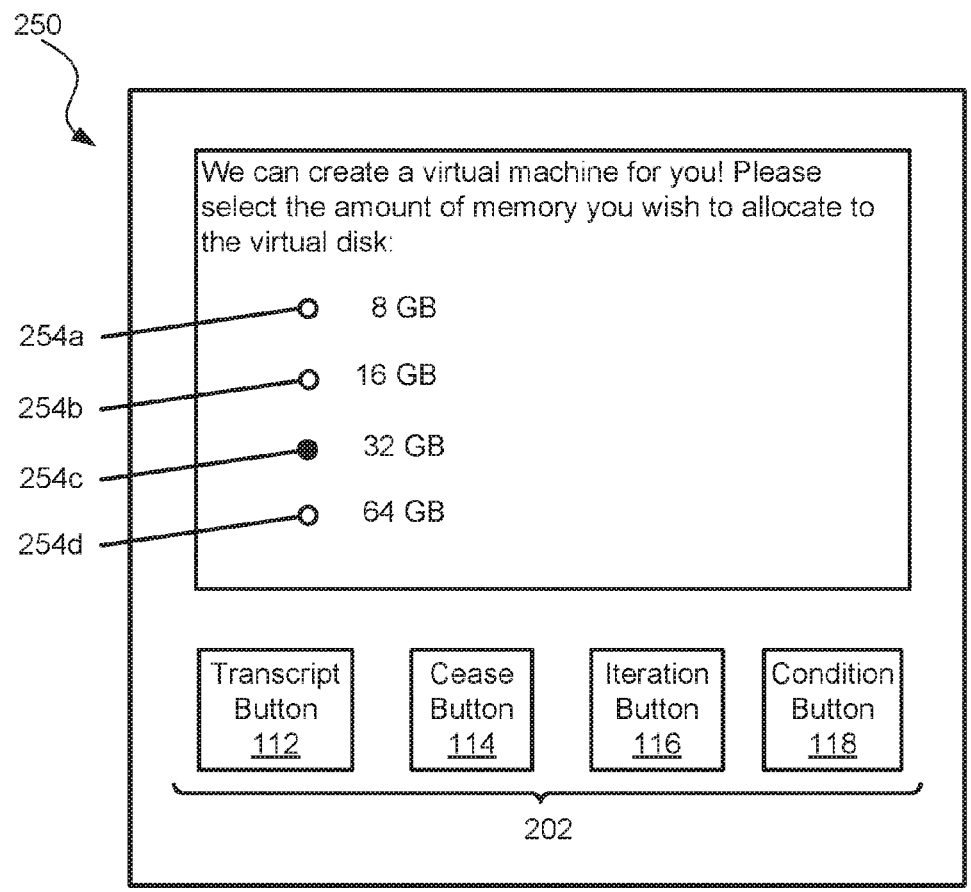
FIG. 2B is an example of another graphical user interface shown on a display coupled to the computing device in accordance with one or more embodiments

After selecting user interface element 204a, the user may proceed to start the virtual machine and manipulate it. FIG. 2B is an example graphical user interface 250 shown on a display coupled to computing device 102 in accordance with one or more embodiments. In FIG. 2B, graphical user interface 250 includes first set of user interface elements 202 and a third set of user interface elements 254. Third set of user interface elements 254 includes a user interface element 254a corresponding to an event that allocates 8 gigabytes (GBs) of memory to a virtual disk for the newly created virtual machine, a user interface element 254b corresponding to an event that allocates 16 GBs of memory to the virtual disk for the newly created virtual machine, a user interface element 254c corresponding to an event that allocates 32 GBs of memory to the virtual disk for the newly created virtual machine, and a user interface element 254d corresponding to an event that allocates 32 GBs of memory to the virtual disk for the newly created virtual machine. In the example illustrated in FIG. 2B, the user has selected user interface element 254c and "32 GB" may be a parameter to the script that is generated by script generator 122. Computing device 102 may proceed to display additional user interface elements that are selectable by the user.

III. Example Process Flow

Figure 3:
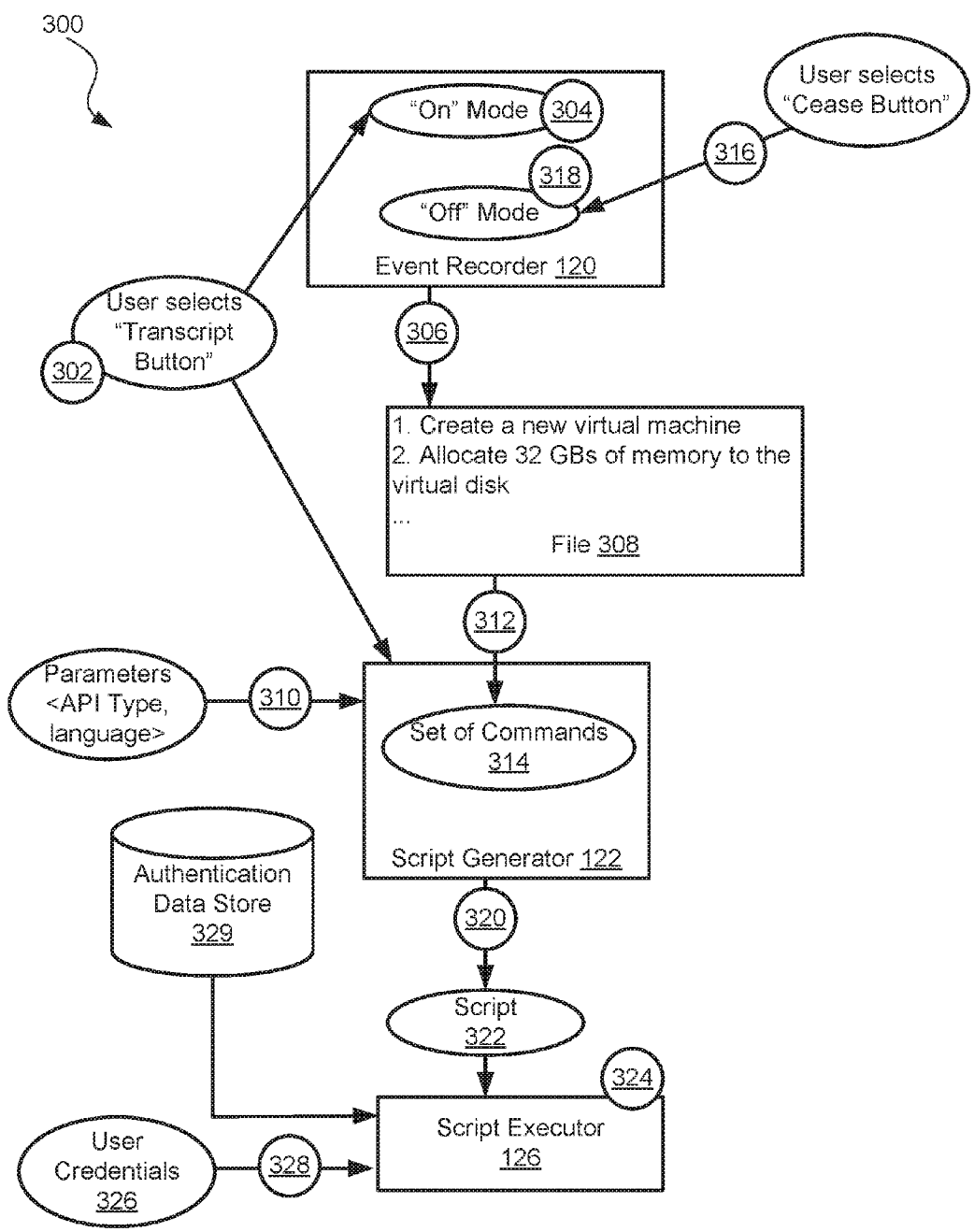
FIG. 3 is a process flow for generating a script that corresponds to the user-selected events illustrated in FIGS. 2A and 2B and that is specific to an API type and/or language in accordance with one or more embodiments.

FIG. 3 is a process flow 300 for generating a script that corresponds to the user-selected events illustrated in FIGS. 2A and 2B and that is specific to an API type and/or language in accordance with one or more embodiments. Process flow 300 is not meant to be limiting and may be used in other applications. Process flow 300 may be performed by processing logic that may include hardware (e.g., circuitry, dedicated logic, programmable logic and microcode), software (such as instructions run on a computer system, specialized hardware, dedicated machine, or processing device), firmware, or a combination thereof. In some examples, process flow 300 is performed by the computing device 102 illustrated in FIG. 1. For example, process flow 300 may be performed on computing device 102. In some examples, the order of the actions described below may also be performed according to alternative orderings. In yet other examples, additional actions may be added and actions that are described may be removed.

At an action 302, the user selects transcript button 112. By selecting transcript button 112, the user may send a request to event recorder 120 to record events selected by the user via graphical user interface 110. In response to the user selecting transcript button 112, event recorder 120 receives the user's request to record the user-selected events and begins to record each of the user-selectable events. In this example, at an action 304, event recorder 120 is placed in an "on" mode, in which event recorder 120 records the user-selectable events and continues to record these user-selected events until the event recorder 120 is switched to an "off" mode. In the "off mode," event recorder 120 ceases to record the events selected by the user via graphical user interface 110. Event recorder 120 may switch back to the "on" mode if the user selects transcript button 112.

At an action 306, event recorder 120 monitors the events selected by the user via graphical user interface 110 and records them into a file 308. In the example illustrated in FIG. 3, file 308 has an event "Create a new virtual machine" corresponding to the selection of user interface element 204a shown in FIG. 2A and an event "Allocate 32 GBs of memory to the virtual disk" corresponding to the selection of user interface element 254c shown in FIG. 2B. It should be understood that file 308 may include more than two user-selected events. For example, event recorder 120 may continue to record the user-selected events into file 308 until event recorder 120 is placed in the "off" mode.

At an action 310, script generator 122 may receive an API type and/or a language in which to generate a script. In some examples, script generator 122 receives the API type and/or language in response to the user selecting transcript button 112. Script generator 122 may use the API type and language as parameters and generate a script specific to the API type and language. In an example, script generator 122 reads configuration file 124 to obtain the API type and/or the language in which to implement the script. An administrator or user may specify in configuration file 124 the API type and/or the language of the desired script. In another example, script generator 122 receives the API type and/or the language in which to implement the script via the user's inputs via the graphical user interface.

A specified API type may be, for example, a RESTful API, CLI API, or SDK API. CLI and SDK may be specified in different languages. For example, a specified language may be Python or JAVA. In an example, if the specified API type is the SDK API and the specified language is Python, script generator 122 may generate Python API code corresponding to the user-selected events. In another example, if the specified API type is the SDK API and the specified language is JAVA, script generator 122 may generate JAVA API code corresponding to the user-selected events. In another example, if the specified API type is the CLI API and the specified language is JAVA, script generator 122 may generate JAVA CLI code corresponding to the user-selected events. In another example, if the specified API type is the RESTful API, script generator 122 may generate REST API code (using any of the post, get, delete, or put commands) corresponding to the user-selected events and in the specified language (e.g., Python, JAVA, etc.). For example, [language=Java, Python; API=REST] may generate a JAVA script using REST API and a Python script using REST API. For example, [language=Python; API=CLI, SDK] may generate a Python script using CLI and a Python script using SDK.

At an action 312, script generator 122 maps the user-selected events recorded in file 308 to a set of commands 314 specific to the specified API type and the specified language. Configuration file 124 may store one or more mappings of user-selected events to one or more commands specific to the API type and language. In an example, script generator 122 may take configuration file 124 as input and for each of the user-selected events, identify the one or more commands to which the respective user-selected event maps.

At an action 316, the user selects cease button 114. By selecting cease button 114, the user may send a request to event recorder 120 to cease recording events selected by the user via graphical user interface 110. In response to the user selecting cease button 114, event recorder 120 receives the user's request to cease recording the user-selected events and stops recording them into file 308. In this example, at an action 318, event recorder 120 is placed in an "off" mode, in which event recorder 120 does not record the events selected by the user via graphical user interface 110. It should be understood that script generator 122 may wait until action 316 occurs before performing action 312 or may map the user-selected events to their corresponding commands as the events are being recorded into file 308 and before action 316 occurs.

At an action 320, script generator 122 generates a script 322 including a command to import a set of modules specific to the API type and language, a command to create a computing session, and set of commands 314. The set of imported modules enables script executor 126, when executing the script to interact with computing device 102 and are used for communication with the relevant API. For example, if the API type is the SDK API and the language is Python, script 322 may include a command to import Python modules and relevant functions in order to execute the script. In an example, the oVirt Python-SDK is an automatically generated SDK for the oVirt engine API. The oVirt Python-SDK allows a developer to develop Python-based applications for automating a variety of complex administrative tasks in oVirt. If the API type is the SDK API and the language is JAVA, script 322 may include a command to import JAVA Archive (JAR) files and relevant functions in order to execute the script. In an example, the oVirt Java-SDK is an automatically generated software development kit for the oVirt engine API. The oVirt Java-SDK allows you to develop Java-based applications for automating a variety of complex administrative tasks in oVirt. If the API type is the REST API type, script 322 may include a command to import a set of HTTP modules (e.g., import urllib2) or a set of XML modules. If the API type is the CLI API and the language is Python, script 322 may include a command to import Python modules and relevant functions in order to execute the script. In an example, script 322 may include a command to import modules such as subprocess or popen to run the CLI commands.

Additionally, script generator 122 records set of commands 314 into script 322. Each recorded command may include zero or more parameters and API code of the API type in the specified language. When the API code is executed, the user-selected event from which the command is mapped is performed. In an example, recording set of commands 314 includes recording the respective parameters associated with the set of commands entered from graphical user interface 110 or from configuration file 124. In some examples, script 322 also includes a command to create a file in which to store set of commands 314 for the computing session.

At an action 324, script executor 126 executes script 322 by executing the commands specified in script 322. For example, script executor 126 may create the computing session specified in script 322 and authenticate user credentials 326. At an action 328, script executor 126 receives user credentials 326 for authentication of the computing session specified in script 322 and compares user credentials 326 with authentication information stored in an authentication data store 329 to authenticate user credentials 326. In an example, user credentials 326 are stored in configuration file 124 and script executor 126 retrieves user credentials 326 from configuration file 124. Script executor 126 compares user credentials 326 with user credentials stored in authentication data store 329. If user credentials 326 matches with user credentials stored in authentication data store 329, script executor 126 may successfully authenticate user credentials 326. If user credentials 326 does not match with any user credentials stored in authentication data store 329, user credentials 326 may fail authentication.

In another example, script executor 126 receives user credentials 326 from graphical user interface 110. In such an example, the user may be prompted on graphical user interface 110 to enter her username and password, this entered information may be user credentials 326. Script executor 126 may receive this user input as user credentials 326. In another example, script executor 126 may insert the credentials of the logged-in user into configuration file 124 or script 322. In such an example, script executor 126 may determine that user credentials 326 are not stored in configuration file 124 or script 322.

Script executor 126 may continue to execute script 322 if user credentials 326 are successfully authenticated. For example, if user credentials 326 are authenticated, script executor 126 may proceed to authenticate the computing session, execute the command to import the set of modules specific to the API type and language, and execute set of commands 314. In contrast, script executor 126 may send an error message to a display coupled to computing device 102 if user credentials 326 are not successfully authenticated.

In some examples, when the user selects transcript button 112, every frontend operation that is selected by the user is automatically translated to the relevant API command and/or language. These API commands may be added to a file associated with the computing session. In response to the user selecting cease button 114, the file may be closed and the user can see and/or run script 322.

Accordingly, rather than create a script from scratch, the present disclosure provides techniques to record events selected by a user via a graphical user interface 110, record these selected events, map them to a set of commands specific to a specified API type and/or language, and generate scripts based on the commands. An advantage of an embodiment may save time and the cost of generating different scripts specific to a specified API type and/or language. For example, new automation developers may get started with API coding. Additionally, manual testers may reproduce their use cases.

In an example, script executor 126 determines whether a condition associated with a task has been satisfied. In such an example, script executor 126 may execute a particular command associated with the condition in script 322 in response to a determination that the condition has been satisfied. In another example, script executor 126 receives, via graphical user interface 110, a request to execute script 322 "X" number of times, where "X" is a positive whole number. In such an example, script executor 126 may execute the script "X" number of times, where executing the script "X" number of times results in the task being accomplished "X" number of times.

In another example, script generator 122 receives, via graphical user interface 110, a request to insert a particular user-selected event into file 308 "X" number of times, where "X" is a positive whole number. In such an example, in response to the request, script generator 122 inserts the particular user-selected event into file 308 "X" number of times. At a later point in time, script executor 126 may execute script 322 and each of the commands corresponding to the particular user-selected events.

In another example, script generator 122 receives, via graphical user interface 110, a request to insert a set of commands from which a particular user-selected event is mapped into script 322 "X" number of times, where "X" is a positive whole number. In such an example, in response to the request, script generator 122 inserts the set of commands into script 322 "X" number of times. At a later point in time, script executor 126 may execute script 322.

As discussed above and further emphasized here, FIGS. 1, 2A and 2B, and 3 are merely examples, which should not unduly limit the scope of the claims. For example, it should be understood that one or more modules (e.g., event recorder 120, script generator 122, and/or script executor 126) may be combined with another module. It should also be understood that one or more modules (e.g., event recorder 120, script generator 122, and/or script executor 126) may be separated into more than one module.

Additionally, although script generator 122 is shown as generating one script specific to an API type and a language, it should be understood that script generator 122 may generate more than one script that is specific to more than one API type and/or language. In an example, script generator 122 generates a heterogeneous plurality of scripts, where each script of the plurality is specific to a different API type and/or language relative to each other. Script generator 122 may store each script into a different file. In some examples, script generator 122 generates a first script specific to Python SDK and a second script specific to JAVA SDK. Additionally, at least two different API types and/or at least two different languages may be received by script generator 122. For example, action 310 may include receiving two different API types and a language for each of these API types.

IV. Example Method

Figure 4:
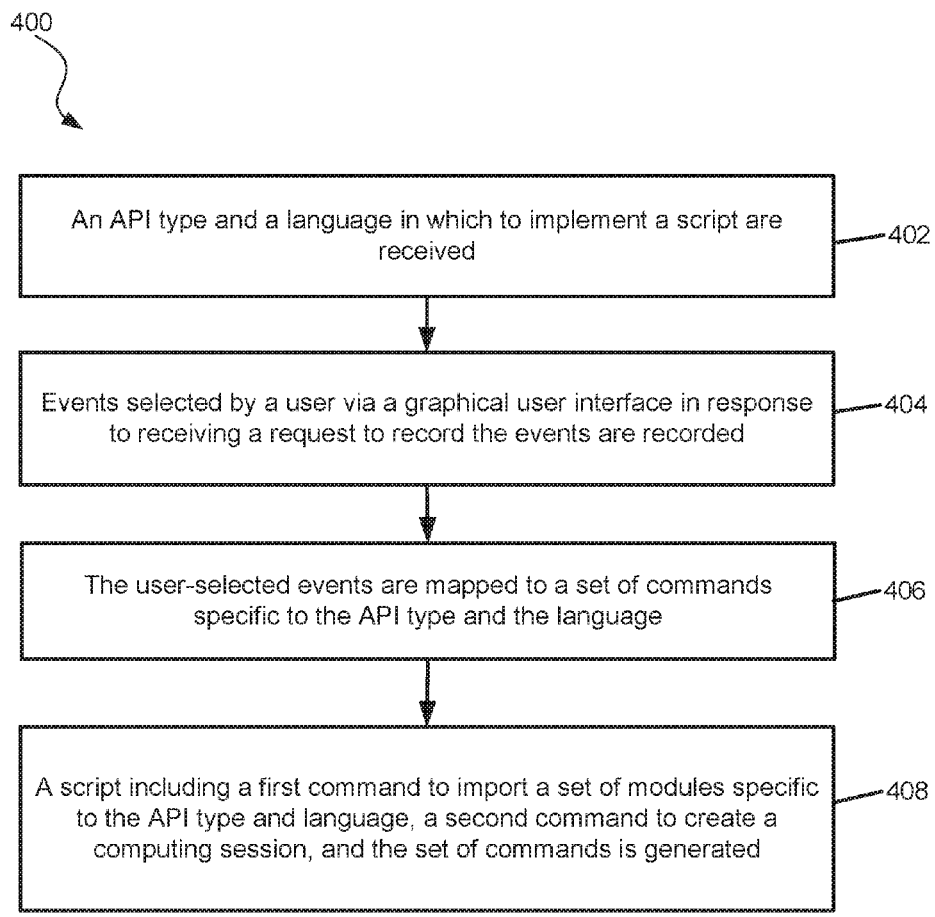
FIG. 4 is a simplified flowchart illustrating a method of generating a script corresponding to events selected by a user via a graphical user interface in accordance with one or more embodiments.

FIG. 4 is a simplified flowchart illustrating a method 400 of generating a script corresponding to events selected by a user via a graphical user interface in accordance with one or more embodiments. Method 400 is not meant to be limiting and may be used in other applications. Method 400 may be performed by processing logic that may include hardware (e.g., circuitry, dedicated logic, programmable logic and microcode), software (such as instructions run on a computer system, specialized hardware, dedicated machine, or processing device), firmware, or a combination thereof. In some examples, the method is performed by system 100 illustrated in FIG. 1. For example, method 400 may be performed on computing device 102. In some examples, the order of the actions described below may also be performed according to alternative orderings. In yet other examples, additional actions may be added and actions that are described may be removed.

Method 400 includes blocks 402-410. In block 402, an API type and a language in which to implement a script are received. In an example, script generator 122 receives an API type and a language in which to implement a script. In block 404, events selected by a user via a graphical user interface in response to receiving a request to record the events are recorded. In an example, event recorder 120 records events selected by a user via graphical user interface 110 in response to receiving a request to record the events. In block 406, the user-selected events are mapped to a set of commands specific to the API type and the language. In an example, script generator 122 maps the user-selected events to set of commands 314 specific to the API type and the language. In block 408, a script including a first command to import a set of modules specific to the API type and language, a second command to create a computing session, and the set of commands is generated. In an example, script generator 122 generates script 322 including a first command to import a set of modules specific to the API type and language, a second command to create a computing session, and the set of commands.

It is also understood that additional method steps may be performed before, during, or after steps 402-408 discussed above. It is also understood that one or more of the steps of method 400 described herein may be omitted, combined, or performed in a different sequence as desired.

V. Example Computing System

Figure 5:
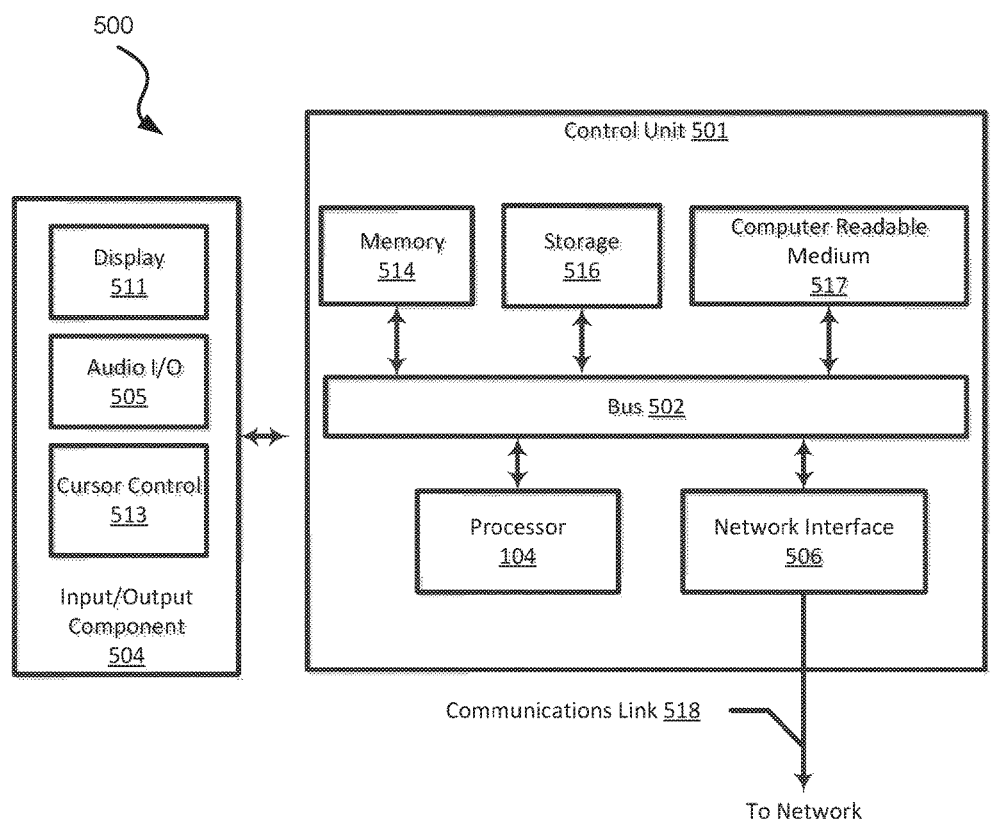
FIG. 5 is a block diagram of an electronic system suitable for implementing one or more embodiments of the present disclosure.

FIG. 5 is a block diagram of a computer system 500 suitable for implementing one or more embodiments of the present disclosure. In various implementations, computing device 102 may be a client or a server computing device. The client or server computing device may include one or more processors. The client or server computing device may additionally include one or more storage devices each selected from a group consisting of floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read. The one or more storage devices may include stored information that may be made available to one or more computing devices and/or computer programs (e.g., clients) coupled to the client or server using a computer network (not shown). The computer network may be any type of network including a LAN, a WAN, an intranet, the Internet, a cloud, and/or any combination of networks thereof that is capable of interconnecting computing devices and/or computer programs in the system.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons or links, etc., and sends a corresponding signal to bus 502. I/O component 504 may also include an output component such as a display 511, and an input control such as a cursor control 513 (such as a keyboard, keypad, mouse, etc.). An optional audio input/output component 505 may also be included to allow a user to use voice for inputting information by converting audio signals into information signals. Audio I/O component 505 may allow the user to hear audio.

A transceiver or network interface 506 transmits and receives signals between computer system 500 and other devices via a communications link 518 to a network. In an embodiment, the transmission is wireless, although other transmission mediums and methods may also be suitable. A processor 104, which may be a micro-controller, digital signal processor (DSP), or other processing component, processes these various signals, such as for display on computer system 500 or transmission to other devices via communications link 518. Processor 104 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor 104 and other components by executing one or more sequences of instructions contained in system memory component 514. Logic may be encoded in a computer readable medium, which may refer to any medium that participates in providing instructions to processor 104 for execution. Such a medium may take many forms, including but not limited to, non-volatile media, volatile media, and transmission media. In various implementations, non-volatile media includes optical, or magnetic disks, or solid-state drives, volatile media includes dynamic memory, such as system memory component 514, and transmission media includes coaxial cables, copper wire, and fiber optics, including wires that include bus 502. In an embodiment, the logic is encoded in non-transitory computer readable medium. In an example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences (e.g., process flow 300 and/or method 400) to practice the present disclosure may be performed by computer system 500. In various other embodiments of the present disclosure, a plurality of computer systems 500 coupled by communications link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Figure 6:
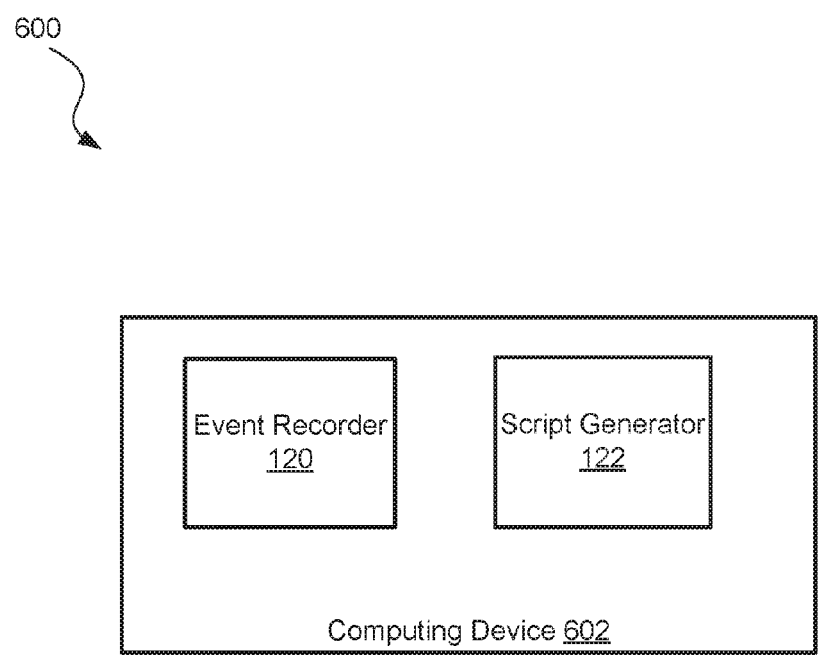
FIG. 6 is a block diagram illustrating a system for generating a script corresponding to events selected by a user via a graphical user interface in accordance with one or more embodiments.

FIG. 6 is a block diagram illustrating a system for generating a script corresponding to events selected by a user via a graphical user interface in accordance with one or more embodiments. System 600 includes a computing device 602, which includes event recorder 120 and script generator 122.

Figure 7:
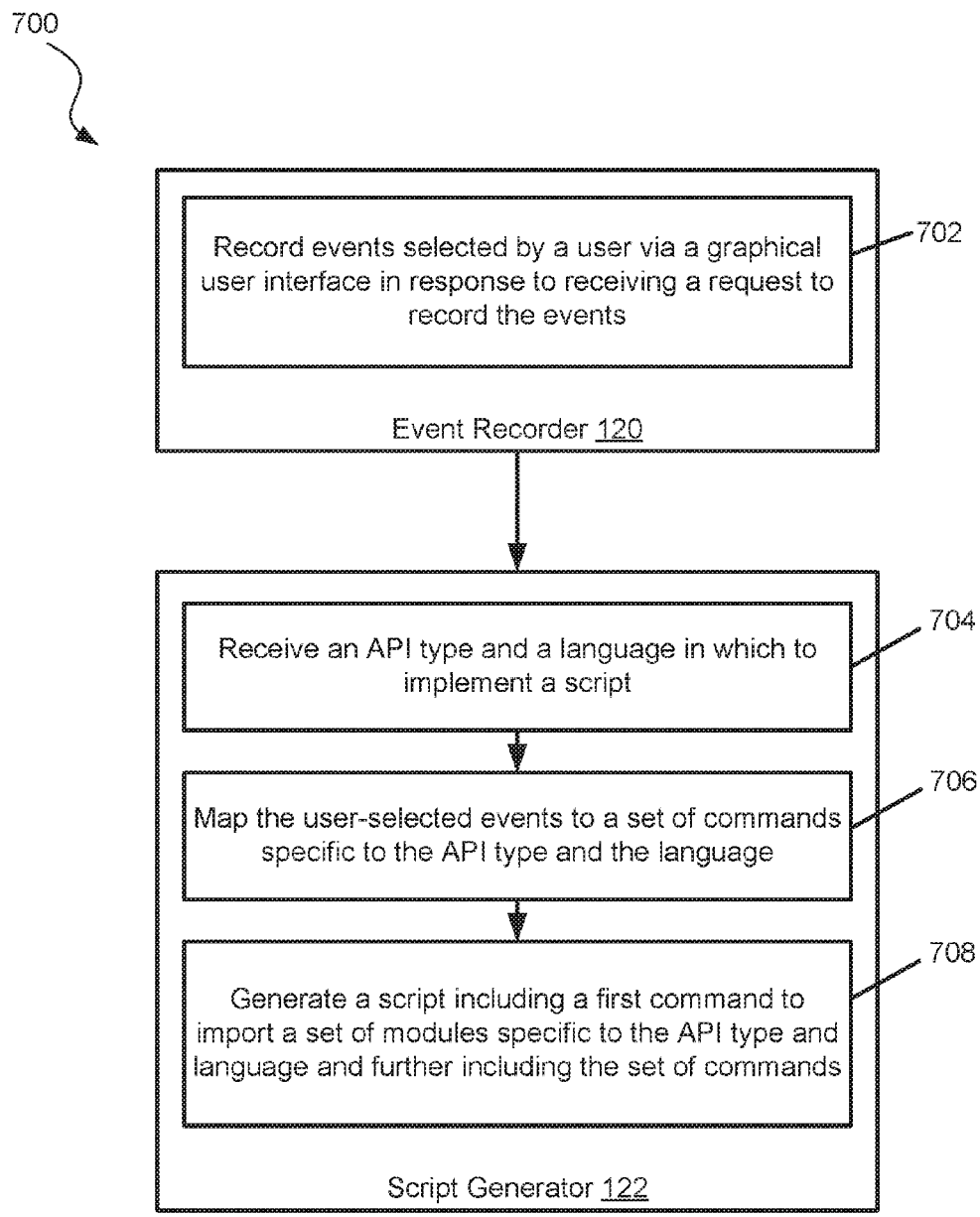
FIG. 7 is a process flow for generating a script in accordance with one or more embodiments.

FIG. 7 is a process flow 700 for generating a script in accordance with one or more embodiments. In the example illustrated in FIG. 7, at a block 702, event recorder 120 records events selected by a user via a graphical user interface in response to receiving a request to record the events. In a block 704, script generator 122 receives an API type and a language in which to implement a script. In a block 706, script generator 122 maps the user-selected events to a set of commands specific to the API type and the language. In a block 708, script generator 122 generates a script including a first command to import a set of modules specific to the API type and language and further including the set of commands.

Where applicable, various embodiments provided by the present disclosure may be implemented using hardware, software, or combinations of hardware and software. Also where applicable, the various hardware components and/or software components set forth herein may be combined into composite components including software, hardware, and/or both without departing from the spirit of the present disclosure. Where applicable, the various hardware components and/or software components set forth herein may be separated into sub-components including software, hardware, or both without departing from the spirit of the present disclosure. In addition, where applicable, it is contemplated that software components may be implemented as hardware components, and vice-versa.

Application software in accordance with the present disclosure may be stored on one or more computer readable mediums. It is also contemplated that the application software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Changes may be made in form and detail without departing from the scope of the present disclosure. Thus, the present disclosure is limited only by the claims.

What is claimed is:

1. A method of generating a script specific to an application programming interface (API) type and language and in accordance with at least one user-selected event, the method comprising:
   receiving a configuration file to obtain an API type and a language in which to implement a script;
   displaying a first set of user interface (UI) elements and a second set of UI elements, the first set of UI elements being independent of the second set of UI elements;
   detecting selection of a UI element of the first set, the selection of the UI element of the first set corresponding to a request to record at least one event associated with the second set of UI elements;
   in response to detecting selection of the UI element of the first set, for each selection of a UI element of the second set, a script generator performing the steps of:
      recording an event corresponding to the respective UI element selected by a user via a graphical UI; and
      dynamically mapping the respective user-selected event to a set of one or more commands specific to the API type and the language obtained from the configuration file, execution of the set of one or more commands accomplishing a respective task associated with the recorded events; and
   generating the script including a first command to import a set of one or more modules specific to the API type and the language and including at least two sets of one or more mapped commands specific to the API type and the language, the script being specific to the API type and the language.

2. The method of claim 1, wherein generating the script includes recording the set of one or more commands into the script, and each recorded command including zero or more parameters.

3. The method of claim 1, wherein the script further includes a second command to create a computing session and a third command to create a file for the computing session.

4. The method of claim 3, further including:
   receiving, by a computing device, user credentials for authentication of the computing session, the user credentials from an authentication data store;
   authenticating the user credentials, wherein the first command and each of the sets of one or more commands are executed if the user credentials are successfully authenticated; and
   sending an error message to a display coupled to the computing device if the user credentials are not successfully authenticated.

5. The method of claim 4, wherein the user credentials are stored in the configuration file.

6. The method of claim 1, further including:
   executing the script.

7. The method of claim 6, further including:
   determining whether a condition associated with the task has been satisfied, wherein executing the script includes in response to a determination that the condition has been satisfied, executing the script.

8. The method of claim 1, wherein the first set includes a button, the method further including:
   receiving, via the button displayed on a second graphical UI, a user request to record at least one event.

9. The method of claim 1, further including:
   receiving, via a second graphical UI, a request to execute the script a first number of times; and
   executing the script the first number of times, wherein executing the script the first number of times results in the task being accomplished the first number of times.

10. The method of claim 2, wherein recording the event includes recording the respective parameters associated with the event entered from the UI.

11. The method of claim 1, further including:
   detecting selection of a second UI element of the first set, the selection of the second UI element corresponding to a user request to cease recording user-selected events; and
   in response to detecting selection of the second UI of the first set, ceasing the recordings of the user-selected events.

12. The method of claim 1, further including:
   receiving a second API type and a second language in which to implement a second script;
   in response to detecting selection of the UI element of the first set, for each selection of the UI element of the second set, mapping the respective user-selected event to a second set of one or more commands specific to the second API type and the second language; and
   generating the second script including a second command to import a second set of one or more modules specific to the second API type and the second language and further including each of the second sets of one or more commands specific to the second API type and the second language.

13. A system for generating a script specific to an application programming interface (API) type and language and in accordance with at least one user-selected events on a user interface, the system comprising:
   a display that displays a first set of user interface (UI) elements and a second set of UI elements, wherein the first set of UI elements is independent of the second set of UI elements;
   an event recorder that detects selection of a UI element of the first set and one or more UI elements of the second set, wherein the selection of the UI element of the first set corresponds to a request from a user to record at least one user-selected event associated with the second set of UI elements; and
   a script generator that receives a configuration file to obtain an API type and a language in which to implement a script, wherein in response to detecting selection of the UI element of the first set, for each selection of a UI element of the second set, (i) the event recorder records an event corresponding to the respective UI element selected by the user via a graphical UI and (ii) the script generator dynamically maps the respective user-selected event to a set of one or more commands specific to the API type and the language obtained from the configuration file and generates the script including a first command to import a set of one or more modules specific to the API type and the language and including at least two sets of one or more mapped commands specific to the API type and the language wherein execution of the set of one or more commands accomplishes a respective task associated with the recorded events, and wherein the script is specific to the API type and the language.

14. The system of claim 13, wherein the graphical UI includes a first button that when selected by the user causes the event recorder to record the at least one user-selected event.

15. The system of claim 14, wherein the graphical UI includes a second button that when selected by the user causes the event recorder to cease recording the at least one user-selected event.

16. The system of claim 13 further comprising:
a script executor that receives a number, and the graphical user interface includes a third button that when selected by the user causes the script to execute the script N times, where N is the number.

17. The system of claim 13, wherein the graphical UI includes a third button, the system further comprising:
a script executor that in response to selection of the third button by the user, determines whether a condition associated with the task has been satisfied, wherein in response to a determination that the condition has been satisfied, the script executor executes the set of one or more commands.

18. A non-transitory machine-readable medium comprising a plurality of machine-readable instructions that when executed by one or more processors is adapted to cause the one or more processors to perform a method comprising:
receiving a configuration file to obtain an API type and a language in which to implement a script;
displaying a first set of user interface (UI) elements and a second set of UI elements, the first set of UI elements being independent of the second set of UI elements;
detecting selection of a UI element of the first set, the selection of the UI element of the first set corresponding to a request to record at least one event associated with the second set of UI elements;
in response to detecting selection of the UI element of the first set, for each selection of a UI element of the second set, a script generator performing the steps of:
recording an event corresponding to the respective UI element selected by a user via a graphical UI; and
dynamically mapping the respective user-selected event to a set of one or more commands specific to the API type and the language obtained from the configuration file, execution of the set of one or more commands accomplishing a respective task associated with the recorded events; and
generating the script including a first command to import a set of one or more modules specific to the API type and the language and including at least two set of one or more mapped commands specific to the API type and the language, the script being specific to the API type and the language.

* * * * *